United States Patent [19]

Thedford et al.

[11] Patent Number: 5,038,552
[45] Date of Patent: Aug. 13, 1991

[54] DRIVE MECHANISM FOR A PICKER ROTOR ASSEMBLY OF A COTTON HARVESTING UNIT

[75] Inventors: G. Neil Thedford; Jesse H. Orsborn, Hinsdale, both of Ill.

[73] Assignee: J. I. Case Company, Racine, Wis.

[21] Appl. No.: 512,890

[22] Filed: Apr. 23, 1990

[51] Int. Cl.⁵ .......................................... A01D 46/18
[52] U.S. Cl. .......................................... 56/44; 56/50; 192/56 R
[58] Field of Search ................... 56/36, 37, 40, 41, 44, 56/50, 28, 33; 192/56 R, 56 C

[56] References Cited

U.S. PATENT DOCUMENTS

| | | | |
|---|---|---|---|
| 2,821,832 | 2/1958 | Morkoski | 56/44 |
| 3,958,397 | 5/1976 | Stiff | 56/10.3 |
| 4,556,131 | 12/1985 | Chapman | 192/55 |
| 4,579,201 | 4/1986 | Tiedeman | 192/56 C |
| 4,866,918 | 9/1989 | Engelstad et al. | 56/40 |

Primary Examiner—Terry Lee Melius
Attorney, Agent, or Firm—Dressler, Goldsmith, Shore, Sutker & Milnamow, Ltd.

[57] ABSTRACT

A drive mechanism for a picker rotor assembly of a cotton harvesting unit. The drive mechanism includes a bidirectional torque limiting mechanism operatively arranged between a rotor drive mechanism and the rotor assembly. The bidirectional torque limiting mechanism for applying a relatively low torque in a first rotational direction to the picker rotor assembly so as to inhibit damage thereto resulting from a chokage or jamming of the picker rotor assembly. The bidirectional torque limiting mechanism further applying a relatively high torque in a second or reverse rotational direction to the picker rotory assembly to facilitate removal of that which choked or stopped the rotor assembly.

14 Claims, 4 Drawing Sheets

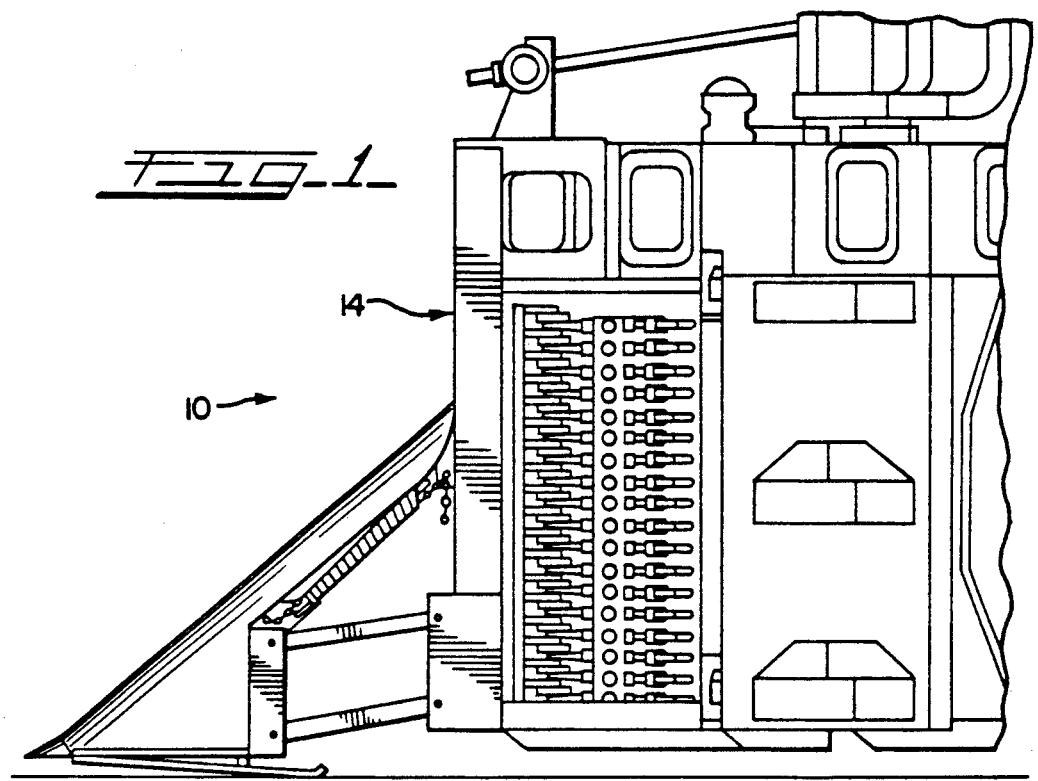
FIG_1
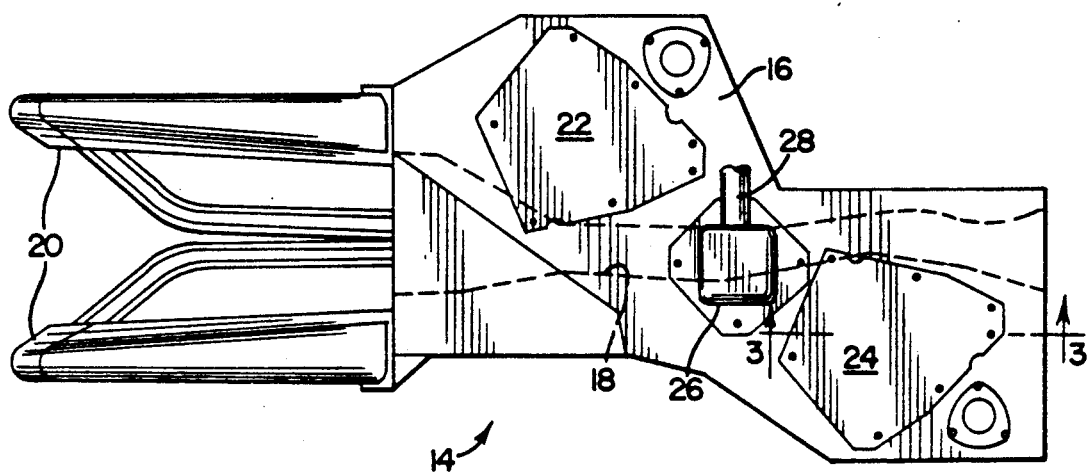
FIG_2

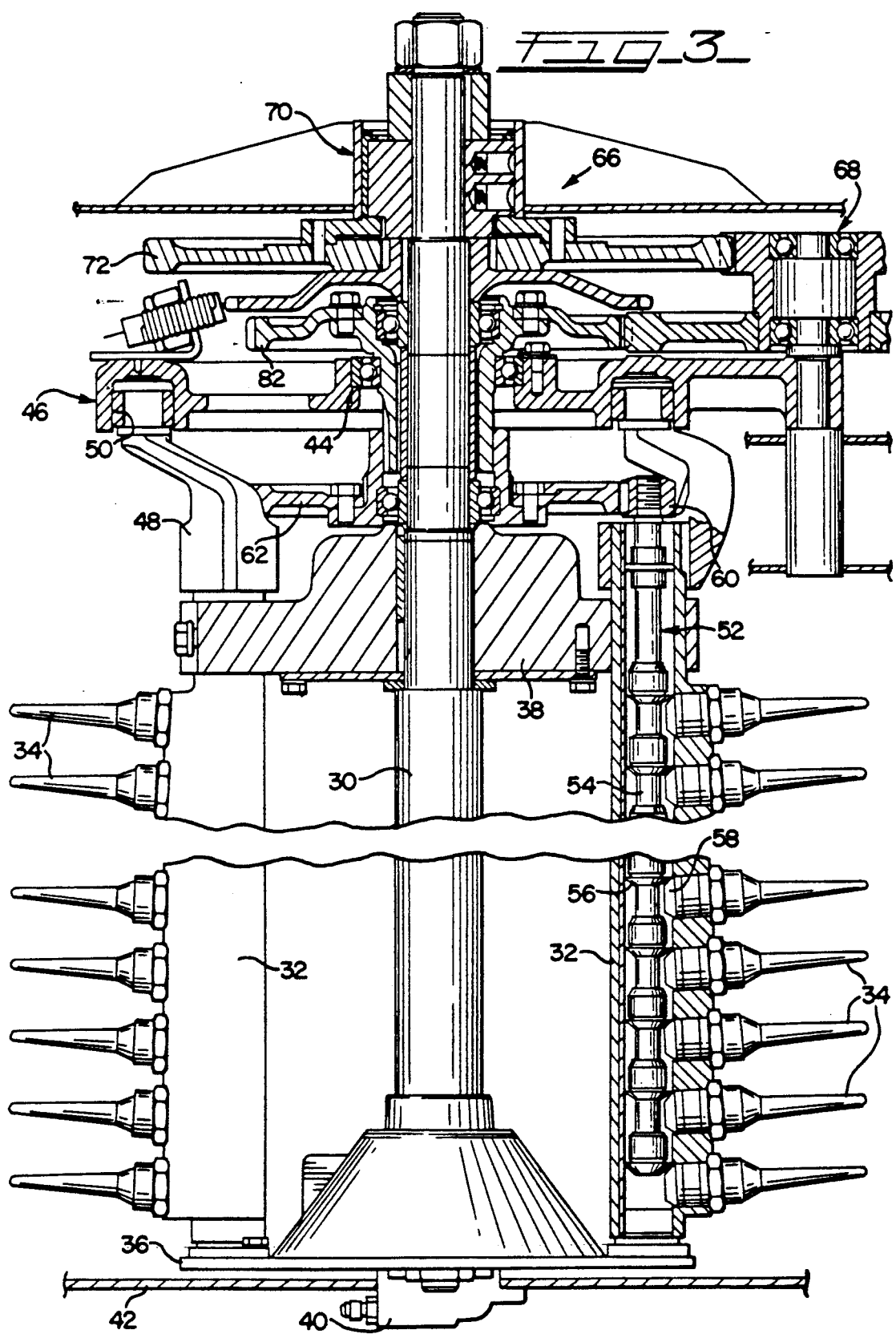

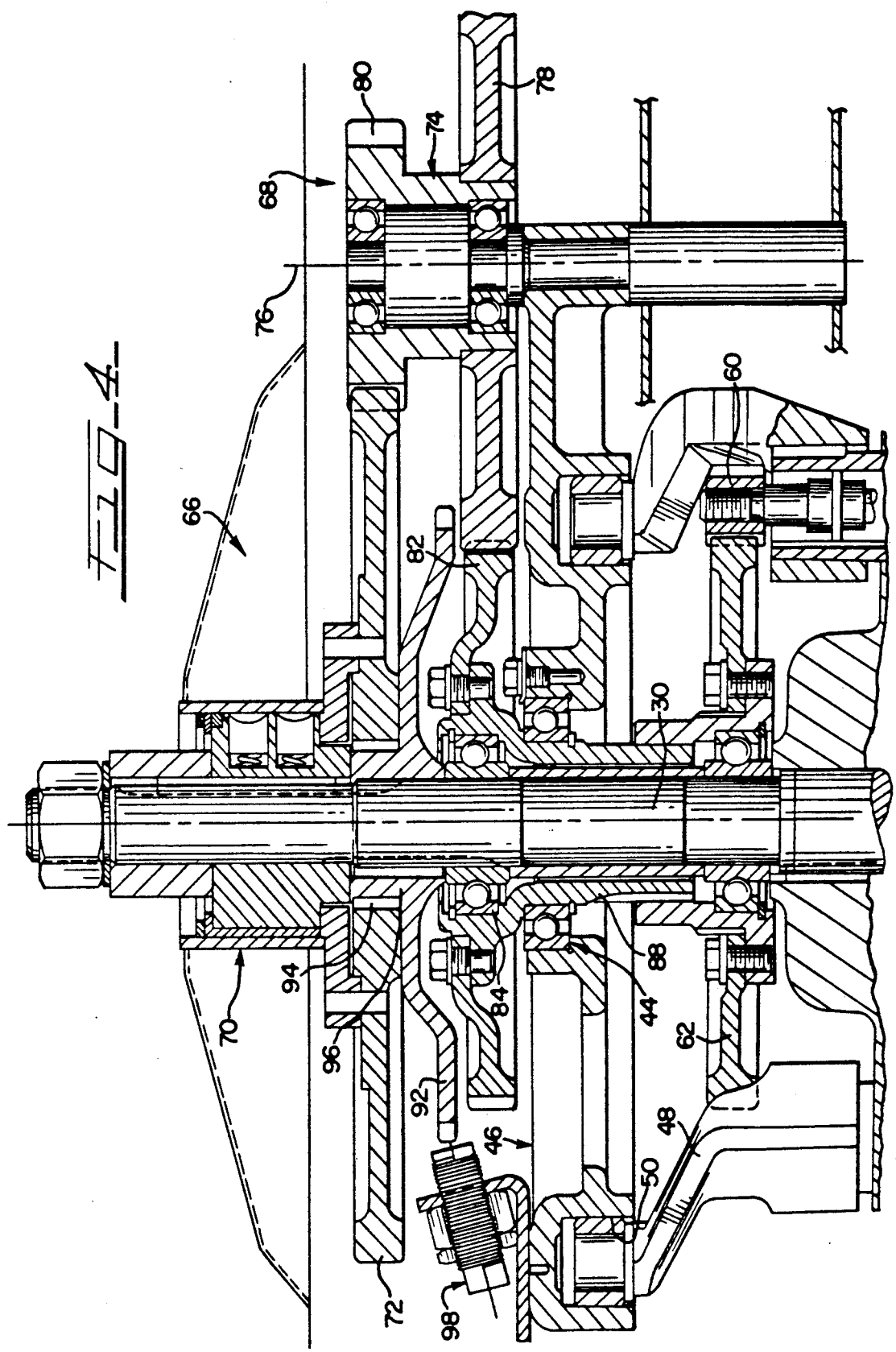

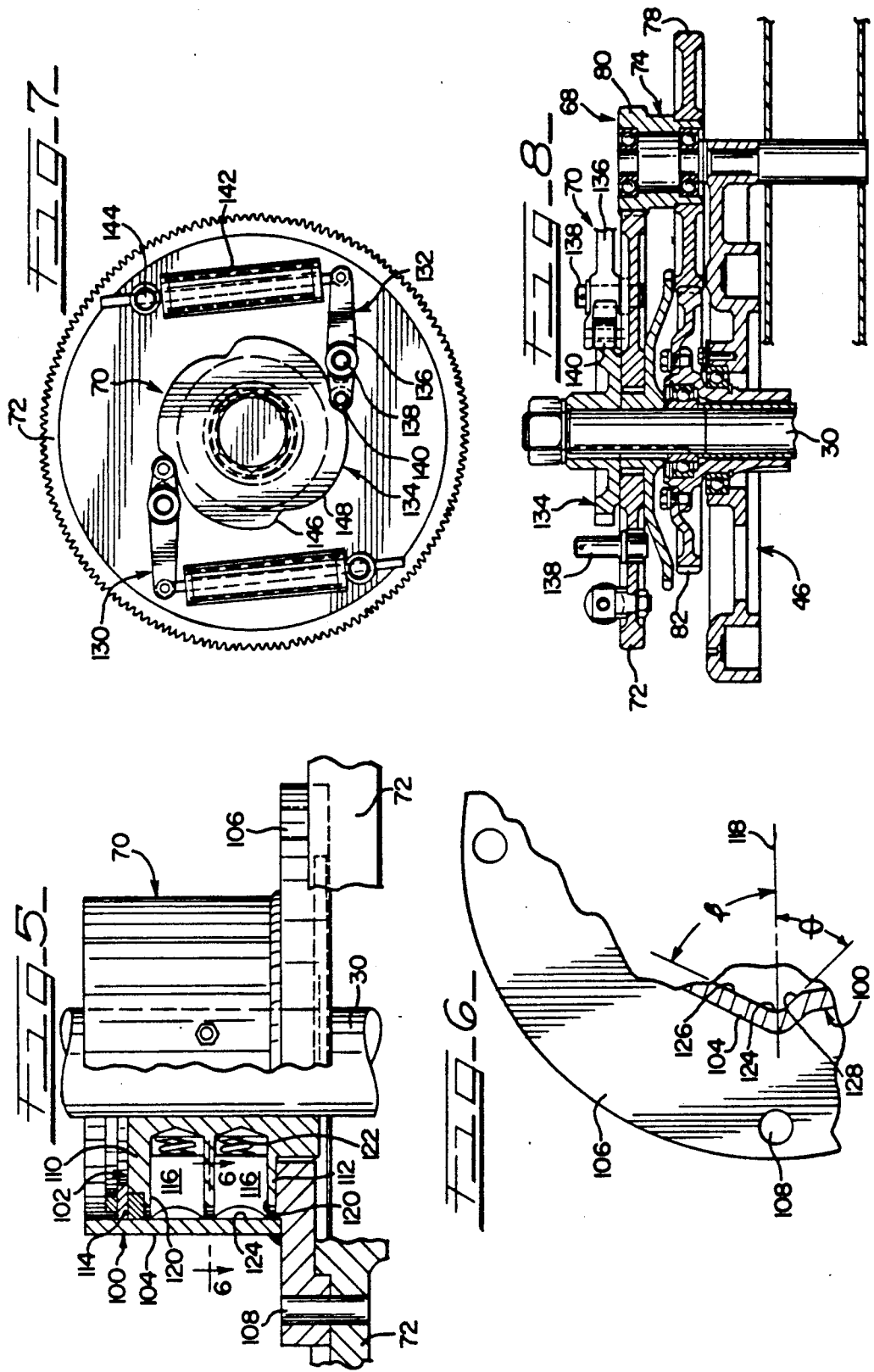

ical speed substantially equal to the ground speed of the harvester such that there is no substantial movement of translation between the rotary assemblies and the cotton plant being operated upon so as to inhibit damage to the plant.

DRIVE MECHANISM FOR A PICKER ROTOR ASSEMBLY OF A COTTON HARVESTING UNIT

FIELD OF THE INVENTION

The present invention generally relates to cotton harvesters and, more particularly, to an improved drive mechanism for a picker rotor assembly of a cotton harvesting unit on a cotton harvester.

BACKGROUND OF THE INVENTION

A typical cotton harvester has two or more cotton harvesting units at a forward end thereof. As the cotton harvester is driven across a cotton field, adjacent and generally parallel rows of cotton pass through respective plant passages defined by the harvesting units. To harvest the cotton, each harvesting unit includes picker rotor assemblies which are rotatably driven with a peripheral speed substantially equal to the ground speed of the harvester such that there is no substantial movement of translation between the rotary assemblies and the cotton plant being operated upon so as to inhibit damage to the plant.

Although considerable design effort has advantageously resulted in the rotor assembly having reduced size and weight, the construction, harsh usage and required operation of such an assembly mandates a relatively large sized unit having considerable size and weight. Each rotor assembly of a harvesting unit includes an elongated drive shaft, 12-15 substantially vertical and hollow picker bars, upper and lower picker bar supports connected to the drive shaft for mounting the picker bars about the periphery of the rotor assembly, and 14-20 cotton picker spindles radially extending from each picker bar and in close vertical relation with each other. Each rotor assembly further includes a drive shaft in each picker bar with complementary gear sets on each shaft and picker spindle for rotating the respective spindles about their axes. Suitable drive gears are also provided for rotating the rotor assembly. As will be appreciated, and because of the mass and number of components mounted thereon, each rotor assembly develops considerable momentum upon rotation thereof.

During a harvesting operation, a dense cotton plant or a plant having extremely thick stalks has been known to choke or jam the rotor assembly. Alternatively, a foreign obstacle, such as a rock or the like, lodges in the plant passage of the harvesting unit will likewise cause jamming of the rotor assembly. Because the driver of the cotton harvester is usually incapable of anticipating a chokage or jamming prior to its occurrence, the momentum of the rotor assembly contributes the extensive damage or breakage of the rotor components before the rotor assembly is ultimately stopped. In addition to repairing or replacing the damaged rotor components, the driver is required to clear the obstacles which initially caused the chokage or jamming prior to continuing the harvesting operation.

As will be appreciated, time is a premium concern during the cotton harvesting season. Therefore, it is essential that any damage to the rotor assembly be either inhibited or minimized to maximize harvesting efficiency. Moreover, the effort expended to return the harvesting unit to full efficiency following a chokage or stoppage should be minimized.

SUMMARY OF THE INVENTION

In view of the above, and in accordance with the present invention, there is provided an improved drive mechanism which inhibits damage to a picker rotor assembly ;of a cotton harvesting unit upon engagement with an obstacle which impedes rotation of the rotor assembly. Briefly stated, the improved drive mechanism applies a relatively low torque in a first rotational direction to the picker rotor assembly such that if a chokage or stoppage occurs, the rotor assembly will stop before the momentum thereof results in damage to the parts provided thereon. Moreover, the improved drive mechanism of the present invention is capable of applying a relatively high torque in a second or reverse rotational direction to the rotor assembly to facilitate removal of the obstacle which has stopped or otherwise impeded rotation of the rotor assembly.

The rotor assembly of the harvesting unit includes a drive shaft, a plurality of picker bars, with each bar having a plurality of picker spindles vertically spaced along the length of each picker bar, and other rotor components. The drive shaft of the rotor assembly is rotationally supported in a housing assembly and defines an upright or generally vertical axis about which the rotor assembly rotates. The picker bars are supported at their upper and lower ends and are circumferentially arranged about the vertical axis of the rotor assembly. The picker spindles are arranged in close proximity to each other and are individually rotationally driven about their axes for picking cotton from a plant row passing through the housing assembly.

The improved drive mechanism of the present invention comprises a rotary drive assembly and a bidirectional to limiting mechanism. The drive assembly normally drives the rotor assembly in a first rotational direction for picking cotton as the plant row moves through the plant passage and is selectively operable to drive the rotor assembly in a second rotational direction opposed to the first direction. In a preferred form, the drive assembly drives the rotor assembly through an input gear arranged for rotation about the axis of the rotor and in driving engagement with the drive assembly while conjointly rotating the picker spindles about their individual axes.

The bidirectional torque limiting mechanism is arranged between the rotary drive assembly and the rotor assembly for transferring rotary motion and a relatively low torque to the rotor assembly when driven in the first direction and transfers rotary motion and a relatively high torque to the rotor assembly when driven in a second direction. The relatively low torque transference capability of the bidirectional torque limiting mechanism protects the rotor assembly and drive assembly by allowing the drive assembly to continue to operate when an obstacle or obstruction stops the rotor assembly or the rotational speed of the rotor assembly lags behind its timed relation speed with the drive assembly. When driven in a first or cotton harvesting direction, it is desirable to establish a low torque transference level to reduce the likelihood that the momentum of the rotor assembly will damage the rotor components when the rotor assembly is abruptly stopped while operating at harvesting or operational speeds.

On the other hand, when the drive assembly is operated in a second direction, the relatively high torque transference capability of the bidirectional torque limiting mechanism facilitates removal of the obstruction from the rotor assembly simply by the operator reversing operation of the harvesting unit. When the drive assembly is operated in a second direction, the bidirectional torque limiting mechanism is designed to slip at a predetermined upper limit to inhibit damage to the rotor components should the obstruction not be freed as a result of the spindles acting thereon.

In a preferred form of the invention, the torque applied to the rotor assembly by the torque limiting mechanism when the rotor assembly is driven in the reverse or second direction is about three times greater than the torque applied to the rotor assembly by the torque limiting means when the rotor assembly is driven in a first direction. In a preferred form, the torque limiting mechanism is configured to allow a torque in the range of about 60 to 80 foot/pounds to be applied by the drive assembly to the rotor assembly in the first direction and allows a torque in the range of about 175 to about 250 foot/pounds to be applied by the drive assembly to the rotor assembly in the second direction.

In accordance with the preferred embodiment of the invention, the bidirectional torque limiting mechanism includes drive and driven elements concentrically arranged and cooperatively associated with each other to transfer motion and torque between the drive assembly and the rotor assembly. The drive element includes a cylindrical sleeve arranged for rotation about the vertical axis of the rotor assembly. Preferably, the drive sleeve element is connected to and rotatable with the input gear driven by the drive assembly. The sleeve of the drive element defines an interior profiled surface comprised of a series of ramped surfaces. The driven element is arranged for rotation about the vertical axis of the rotor assembly and is connected to the drive shaft thereof. The drive and driven elements are releasably maintained in driving relation by a series of detents. The detents are resiliently urged against the profiled surface of the drive element and, in combination with the angle of the ramped surfaces, define the torque applied to the rotor assembly. The detents allow for slippage between the drive assembly and the rotor assembly when the predetermined torque limits of the bidirectional torque limiting mechanism are exceeded.

In accordance with a second embodiment, the bidirectional torque limiting mechanism includes a toothed ratchet member operatively connected to the drive shaft and a series of resiliently biased pawls. The resiliently biased pawls are carried on the input gear for driving engagement with the teeth on the ratchet wheel. The pawls are permitted to escape over the teeth when the torque between the input gear and the rotor assembly exceeds predetermined limits in either direction.

The present invention advantageously provides a drive assembly wherein the momentum of the rotor assembly will be inhibited from damaging the rotor components when the rotor assembly is abruptly stopped in response to choking or jamming thereof. Moreover, the ability to reverse the direction of the drive assembly, and thereby the rotor assembly, will facilitate removal of the obstruction and inhibit damage, if any, to the component parts of the rotor assembly.

Numerous other advantages and features of the present invention will become apparent from the following detailed description of the invention, the appended claims, and the accompanying drawings.

BRIEF DESCRIPTION OF THE DRAWINGS

FIG. 1 is a partial elevational view of a cotton harvester illustrating a harvesting unit connected to a forward end thereof;

FIG. 2 is a schematic plan view of a typical harvesting unit;

FIG. 3 is a longitudinal sectional view taken along line 3—3 of FIG. 2;

FIG. 4 is an enlarged sectional view illustrating an upper end of a picker rotor assembly;

FIG. 5 is an enlarged elevational view, partly in section, of a preferred embodiment of a bidirectional torque limiting mechanism used in combination with the present invention;

FIG. 6 is an enlarged fragmentary view taken along line 6—6 of FIG. 5;

FIG. 7 is a plan view of a second embodiment of a bidirectional torque limiting mechanism used in combination with the present invention; and FIG. 8 is a sectional view similar to FIG. 4 illustrating an upper end of a picker rotor assembly equipped with a second embodiment of the bidirectional torque limiting mechanism.

DETAILED DESCRIPTION OF THE PRESENT INVENTION

While the present invention is susceptible of embodiment in various forms, there is shown in the drawings and will hereinafter be described two presently preferred embodiments of the invention, with the understanding that the present disclosure is to be considered as exemplifications of the invention, which are not intended to limit the invention to the specific embodiments illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame mounted on ground engaging wheels (not shown).

Positioned forwardly on the frame are a plurality of individual cotton harvesting units 14. The harvesting units are preferably arranged side-by-side across a front end of the harvester and are laterally spaced-apart a distance substantially corresponding to the distance between adjacent plant rows. The harvesting units are of generally like construction and, thus, only one harvesting unit will be described in detail, with the understanding that the other harvesting units are similarly constructed.

As illustrated in FIG. 2, each harvesting unit includes a housing assembly 16 defining a fore-and-aft crop receiving opening or passage 18 which allows a plant row to pass therethrough. Each harvesting unit is further provided with stalk lifters 20 on either side of opening 18 to guide the row of cotton plants to the opening or passage 18. Each harvesting unit further includes front and rear picker rotors 22 and 24, respectively. Each picker rotor 22, 24 is adapted to orbit along a predetermined path of travel within the housing and alongside the plant passage 18. The picker rotors 22 and 24 are conjointly driven in timed relation to each other by a prime mover 26 such as a gear box which is driven by an input shaft 28.

The picker rotors 22, 24 are substantially similar in construction to each other. Accordingly, only picker rotor 24 will be described in detail, with the understanding that picker rotor 22 is similarly constructed. As illustrated in FIG. 3, each picker rotor assembly comprises an upright drive shaft 30, a plurality of upright and hollow picker bars 32 peripherally arranged about the respective rotor assembly, a plurality of vertically spaced rotational picker spindles 34, and other rotor components.

As illustrated, the drive shaft 30 is provided with lower and upper support members 36 and 38, respectively, radially extending from and connected for rotation with the shaft 30. The lower support member 36 is rotatably mounted on an upstanding spindle support 40 which is suitably secured to a bottom surface 42 of the housing assembly 16. Above the upper support member 38, drive shaft 30 is rotatably supported by a bearing 44 on a stationary cam 46 which is secured to the housing assembly 16 in the usual manner.

Each picker bar 32 rotates about the axis of the drive shaft 30 and oscillates about its own vertical axis. As illustrated, opposite ends of each picker bar 32 are rotatably supported by the lower and upper support members 36 and 38, respectively. A crank arm 48 extends from an upper end of each picker bar 32. The free end of each crank arm 48 rides in a cam track 50 defined by the stationary cam 46 to move each picker bar and the picker spindles carried thereby along a predetermined path of travel as the picker rotor is rotatably driven about the axis of drive shaft 30.

Each picker bar 32 is provided with a spindle drive mechanism 52 for rotatably and individually driving the picker spindles 34 extending therefrom. As illustrated, each picker bar 32 has a hollow center which accommodates a vertical drive shaft 54. Each drive shaft 54 is connected to and rotatably drives each of the picker spindles. As illustrated, the drive shaft 54 is individually connected to each picker spindle by a bevel gear arrangement including a driving pinion 56 which is in constant mesh with a bevel pinion 58 on the inner end of each picker spindle 34. Each spindle drive mechanism 52 further includes a drive pinion 60 fixed to the upper end of the vertical drive shaft 54 and which meshes with a sungear 62 which is rotatably driven about the rotor drive shaft 30 above the upper support member 38.

Each picker rotor assembly, including drive shaft 30, picker bars 32 and picker spindles 34, is driven by a drive mechanism 66. The drive mechanism 66 of the present invention includes a drive assembly 68 and a bidirectional torque limiting mechanism 70. The drive assembly 68 rotationally drives the rotor assembly in timed relation therewith about the vertical axis of drive shaft 30. The drive assembly 68 is normally operated in a first direction for picking cotton as the plant moves therepast and is selectively operable in a second direction opposed to said first direction. The bidirectional torque limiting mechanism 70 arranged is between the drive assembly 68 and the rotor drive shaft 30. As illustrated, an input gear 72 is arranged toward an upper end of the drive shaft 30 for rotation in either the first or second directions about the vertical axis of the drive shaft 30 in response to actuation of the drive assembly 68.

Turning now to FIG. 4, the drive assembly 68 is rotatably driven in two opposite directions from the prime mover 26 (FIG. 2). The drive assembly direction is determined by the operator of the harvester. As illustrated, the drive assembly 68 includes a combination gear 74 which rotates about a stationary vertical axis 76. The combination gear 74 is preferably driven in opposite directions from the prime mover 26 through a series of intermeshing gears (not shown) or other suitable force transference devices and is configured to drive the rotor assembly 30 in timed relation therewith, while conjointly and individually rotating the picker spindles 34. The combination gear 74 preferably includes a spindle drive gear 78 which is connected for rotation with a rotor drive gear 80.

As illustrated in FIG. 4, the spindle drive gear 78 intermeshes with an input gear 82 which is coaxial with and supported for rotation about the rotor drive shaft 30 by a suitable bearing 84. Gear 82 is provided with a depending sleeve 88 which is journalled by and passes through bearing 44 on cam 46. At its lower end, sleeve 88 is connected to the sungear 62. At its outer periphery, sungear 62 meshes with the plurality of drive pinions 60 provided on the spindle drive mechanism of each picker bar 32 to provide rotation to the picker spindles.

The rotor drive gear 80 of the drive assembly 68 intermeshes with the input gear 72. As illustrated, the input gear 72 is rotatably mounted on a monitoring sprocket 92 which is fitted over the shaft 30 and keyed thereto for rotation therewith. A bearing or bushing 94 is fitted between the input gear 72 and an annular shoulder 96 on the monitoring sprocket 92, for allowing relative rotation between the rotor drive shaft 30 and the input gear 72. A sensor 98 is arranged adjacent the periphery of the monitoring sprocket 92 to monitor whether the rotor drive shaft 30 is turning.

The bidirectional torque limiting mechanism 70 is operably interposed between the rotor drive shaft 30 and the drive assembly 68 for transferring rotary motion and torque therebetween. In a preferred form, the torque limiting mechanism 70 is a two-way clutch which is operable in response to rotation of the drive assembly 68. The torque limiting mechanism 70 applies a relatively low torque having an upper limit to the rotor drive shaft 30 when the drive assembly 68 is driven in one direction and applies a relatively high torque having an upper limit to the rotor drive shaft 30 when the drive assembly 68 is driven in a second direction. As will be appreciated, the rotary directions in which a low or high torque will be applied to the rotor drive shaft 30 upon rotation of the drive assembly 68 will be determined by the particular rotor assembly within the harvesting unit.

In a most preferred form, the two-way clutch mechanism comprising the torque limiting mechanism 70 may be of the type sold by Walterscheid Inc. under Model Nos. 388,044 and 388,045. Notably, the different models sold by Walterscheid Inc. are substantially similar in construction but offer opposite torque transference qualities depending upon their direction of rotation.

Turning to FIG. 5, the torque limiting mechanism 70 comprises a first drive part or element 100 arranged for rotation about the vertical axis of rotor drive shaft 30 and operatively connected to the drive assembly 68 (FIG. 4) through input gear 72, and a second driven part or element 102 operatively associated with the drive part 100 for rotation about the vertical axis of and connected to the rotor drive shaft 30. As illustrated, the drive part 100 is designed as a tubular sleeve 104 with a flange 106 at its lower end. In the illustrated embodiment, flange 106 sits atop the input gear 72 and is suitably connected thereto as by pins 108. In the illustrated embodiment, the driven part 102 is preferably designed as a sleeve 110 which fits over the rotor drive shaft 30 and is keyed or otherwise secured thereto. At its lower end, the driven part 102 is rotationally guided within the flange 106 and defines an outwardly extending annular shoulder 112 which is rotatably supported upon the flange 106. The driven part 102 is prevented from moving upwardly relative to the drive part 100 by an annular snap-ring 114 engaging with an upper end of the driven part 102.

The two-way clutch of the torque limiting mechanism 70 further includes a series of spring-biased detents 116 captively received between the drive and driven parts 100 and 102, respectively, and which allow for slippage between the drive assembly 68 and the rotor drive shaft 30 when a predetermined upper limit of the torque limiting mechanism 70 is exceeded. In the illustrated embodiment, the detents 116 are arranged in an upper set and a lower set. Each set of detents preferably includes eight detents which are evenly spaced-apart and with each detent being endwise reciprocal along a generally linear path of travel, indicated generally by reference numeral 118 in FIG. 6. The reciprocal path of the detents 116 is defined by a series of radially extending cavities 120 defined by the driven member 102. A spring 122 resiliently maintains the outermost end of each detent in confronting relation with an inner profiled surface 124 of drive member 100. To facilitate operation of the clutch assembly, the outermost end of each detent has a chisel-point configuration.

Turning now to FIG. 6, the inner surface 124 of the drive member 100 has a profile comprised of a series of oppositely directed ramped surfaces 126 and 128. The ramped surfaces 126 and 128 are equally spaced about the inner or interior surface 124 of drive member 100 and cooperate with the detents 116 to define the torque applied to the rotor assembly upon actuation of the drive assembly. As illustrated in FIG. 6, ramped surface 126 is disposed at a predetermined angle $\beta$ relative to the reciprocal path 118 of a respective detent associated therewith. Likewise, ramp 128 is disposed at a predetermined angle $\theta$ relative to the reciprocal path 118 of the respective detent associated therewith. As illustrated, the ramp angle $\theta$ relative to the reciprocal path 118 of the respective detent is steeper than the ramp angle $\beta$ relative to the reciprocal path 118 of the respective detent. As will be appreciated, the steeper the ramp angle relative to the reciprocal path 118 of the respective detent, the more force will be required to move the respective detent relative thereto. With the illustrated example, and because of the differences in ramp angles $\theta$ and $\beta$, a higher torque will be transferred in a clockwise rotational direction of the drive member 100 than in a counterclockwise rotational direction of the drive member 100. When the torque transference capacity of the torque limiting mechanism 70 has been exceeded in either direction of rotation, the detents 116 will endwise move against the action of the spring 122 and permit rotational slippage between the drive and driven member 100 and 102, respectively, thereof. Notably, the rotational direction of the rotor will dictate the angular orientation of the ramp surfaces 126 and 128 relative to the reciprocal path of the respective detents 116.

A second preferred embodiment of the invention is shown in FIGS. 7 and 8, and is substantially identical to the function and construction of the first preferred embodiment hereinabove-described, except for the construction of the bidirectional torque limiting mechanism 70. The structural elements which are common between the first and second embodiments are designated by the same reference numerals in FIGS. 1 through 6 and FIGS. 7 and 8, and the disclosure of the relationship and function of the structural elements as discussed above with regard to FIGS. 1 through 4 are incorporated herein by reference and will not herein be repeated.

In the second embodiment, the bidirectional torque limiting mechanism 70 is comprised of a pair of releasable detent assemblies 130 and 132 which operate in combination with a ratchet wheel 134 for transferring rotary motion and applying a relatively low torque having an upper limit to the rotor assembly when the drive assembly 68 is driven in a first direction and for transferring rotary motion and applying a relatively high torque with an upper limit to the rotor assembly when the drive assembly 68 is driven in a second direction.

The detent assemblies 130 and 132 are substantially similar in construction to each other and, thus, only detent assembly 132 will be discussed in detail, with the understanding that detent assembly 130 is similarly constructed. Each detent assembly includes a spring-biased pawl 136 which, intermediate its ends, is rotatably mounted on an upstanding anchor post 138 extending from a top side of the input gear 72. At one end, each pawl 136 is provided with a roller 140, which is movable in an arcuate path of travel having a center defined by the upright vertical axis of anchor post 138. At its second or opposite end, a spring 142 biases the pawl in a manner urging the roller 140 toward the periphery of the ratchet wheel 134. In the illustrated embodiment, a suitable compression spring is entrapped between the second end of pawl 136 and another anchor post 144 provided on the input gear 72.

The ratchet wheel 134 is keyed or otherwise secured to the rotor drive shaft 30. The periphery of the ratchet wheel 134 has a profiled surface defining a series of equally spaced detents. Each detent on the periphery of ratchet wheel 134 has oppositely directed ramp surfaces 146 and 148 and between which the rollers 140 on the pawls 136 are seated. As will be understood, the angle of the ramp surface 146 is steeper relative to the arcuate path of travel of the roller 140 than is the angle of ramp surface 148 relative to the arcuate path of travel of the roller 140. As in the first embodiment, the angular orientation of the ramp 146 and 148 relative to the arcuate path of travel of roller 140 defines the upper limit of the torque applied to the rotor assembly upon actuation of the drive assembly. Notably, the rotational direction of the rotor will dictate the angular orientation of the ramp surfaces 146 and 148 relative to the path of the roller 140.

During operation, the drive assembly 68 is actuated to drive a respective rotor assembly in timed relation therewith. As will be appreciated, upon rotation of the drive assembly 68, the picker spindles 34 are conjointly driven about their individual axes. The drive assembly 68 is driven in a first direction for allowing the respective rotor assembly and picker spindles thereof to pick cotton as the plant row moves through the plant passage 18 defined by the harvesting unit.

The rotation of the rotor drive gear 80 of the drive assembly 68 is transferred to the rotor drive shaft 30 through the bidirectional torque limiting mechanism 70. The bidirectional torque limiting mechanism 70 allows a relatively low torque having an upper limit to be applied to the rotor assembly in the first direction. The upper limit of the low torque applied to the rotor assembly inhibits damage to the rotor components upon their engagement with an obstacle which impedes rotation of the rotor assembly. With either embodiment of the torque limiting mechanism 70, a torque in the range of about 60 to about 80 foot/pounds is applied to the rotor assembly in the first direction. As will be appreciated, the upper limit of the torque applied to the rotor assembly is determined by the angle of the ramp surfaces on the torque limiting mechanism 70. It will be readily appreciated that as soon as a chokage occurs which stops the rotation of or the rotational speed of the respective rotor assembly lags behind its timed relation speed with the drive assembly 68, the torque limiting mechanism 70, upon exceeding the upper limit thereof, slips so as to allow the drive assembly 68 to continue to rotate but without imparting rotary movement to the rotor assembly.

Stoppage of a rotor assembly is detectable by the operator. In the illustrated embodiment, and as mentioned above, sensor 98 monitors rotation of the drive shaft 30, and, thereby, rotation of the respective rotor assembly. When the sensor 98 detects stoppage of the rotor assembly, the operator reverses the drive direction of the drive assembly 68.

To promote continued harvesting operation, while allowing the operator to remain in the cab area of the harvester, the bidirectional torque limiting mechanism 70 allows a relatively high torque having an upper limit to be applied to the rotor assembly when the drive assembly 68 is driven in a second direction to facilitate removal of the obstacle which chokes or stops the rotor from rotating. Because the momentum of the rotor assembly is not a factor to be concerned with in facilitating removal of the stoppage or breakage, the upper limit on the torque which can be transferred to the rotor assembly can be considerably higher in the second direction of rotation of the drive assembly than in the first.

In the preferred embodiment, the upper limit on the torque applied to the rotor assembly by the torque limiting mechanism 70 in the second direction is approximately three times greater than the torque which is applied by the torque limiting mechanism 70 when the drive assembly is operated in the first direction. In the preferred embodiment, the upper limit of torque transfer when the drive assembly 68 is operated in the second direction ranges from about 175 to about 250 foot/pounds. In contrast, the upper limit of torque transfer when the drive assembly 68 is operated in the first direction ranges about 60 to about 80 foot/pounds.

In a most preferred form, the upper limit on the torque applied to the rotor assembly in the second direction of movement of the drive assembly 68 is about 200 foot/pounds. The upper limit on the torque applied to the rotor assembly in a first direction of movement of the drive assembly is most preferably about 70 foot/pounds.

If the obstacle which has caused chokage or stoppage of the rotor assembly is not removed from the path of the rotor assembly before the predetermined upper limit in the second direction of rotation of the bidirectional torque limiting mechanism has been exceeded, the bidirectional torque limiting mechanism 70 will allow slippage between the drive assembly and the rotor assembly to inhibit damage to the rotor components which may result from increased torque being applied to the rotor assembly. In most instances, the obstacle which causes chokage or stoppage of the rotor assembly can be readily removed from the path of the rotor assembly before the upper limit of torque in the second direction of travel of the drive assembly has been exceeded.

From the foregoing, it will be observed that numerous modifications and variations can be effected without departing from the true spirit and scope of the novel concept of the present invention. It will be appreciated that the present disclosure is intended to set forth an exemplification of the invention which is not intended to limit the invention to the specific embodiments illustrated. The disclosure is intended to cover by the appended claims all such modifications as fall within the scope of the claims.

What is claimed is:

1. Drive mechanism for a picker rotor assembly of a cotton harvesting unit, said picker rotor assembly being rotatable about an upright vertical axis for picking cotton from a plant row, said drive mechanism comprising:

rotary means for rotationally driving said rotor assembly in timed relation therewith and about said axis, said rotary means normally driving said rotor assembly in a first direction for picking cotton as the plant row moves through the harvesting unit and being selectively operable to drive said rotor assembly in a second direction which is opposed to said first direction; and bidirectional torque limiting means operable in response to actuation of said rotary means for transferring rotary motion and applying a relatively low torque to said rotor assembly when driven in a first direction and for allowing said rotary means to continue to rotate after the rotor assembly stops or its rotational speed lags behind its timed relation speed with said rotary means, said bidirectional torque limiting means furthermore transferring rotary motion and applying a relatively high torque to said rotor assembly when driven in a second direction.

2. The drive mechanism for a picker rotor assembly according to claim 1 wherein said bidirectional torque limiting means comprises a first part arranged for rotation about said axis and operatively connected to said rotary means, and a second part cooperatively associated with said first part for rotation about said axis and operatively connected to said rotor assembly.

3. The drive mechanism for a picker rotor assembly according to claim 1 wherein said bidirectional torque limiting means comprises a plurality of parts which are configured to coact with each other such that the torque applied to the rotor assembly in said second direction is about three times greater than the torque applied to the rotor assembly in said first direction.

4. The drive mechanism for a picker rotor assembly according to claim 1 wherein said bidirectional torque limiting means includes detent means resiliently urged along a predetermined path of travel and against a profiled surface defined by a series of angularly ramped surfaces, and wherein the angle of each ramped surface relative to the predetermined path of travel of the respective detent means governs the torque applied to said rotor assembly.

5. Drive mechanism for a picker rotor assembly of a cotton harvesting unit, said picker rotor assembly being rotatable about an upright axis and having rotor components including vertically spaced rows of individually rotatable cotton picker spindles for picking cotton from a plant row, said drive mechanism comprising:

drive means for driving said rotor assembly about said axis and for conjointly driving said spindles about their individual axes, said drive means normally driving said rotor assembly in a first direction for picking cotton as the plant row moves through a plant passage defined by the harvesting unit and being selectively operable to drive said rotor assembly in a second direction opposed to said first direction;

gear means arranged for rotation about said axis and in driving engagement with said drive means; and bidirectional torque limiting means arranged between said gear means and said rotor assembly for applying a predetermined relatively low torque having an upper limit to the rotor assembly in said first direction to inhibit damage to said rotor components upon engagement with an obstacle which impedes rotation of the rotor assembly and for applying a relatively high torque having a predetermined upper limit to the rotor assembly in said second direction to enhance removal of said obstacle from the rotor assembly when said rotor assembly is moved in said second direction.

6. The drive mechanism for a picker rotor according to claim 5 wherein said torque limiting means is comprised of a plurality of parts which are configured to allow a torque in the range of about 60 to about 80 foot/pounds to be applied to the rotor assembly in said first direction and to allow a torque in the range of about 175 to abut 250 foot/pounds to be applied to the rotor assembly in said second direction.

7. The drive mechanism for a picker rotor assembly according to claim 5 wherein said bidirectional torque limiting means comprises driven means arranged for rotation with said rotor assembly about said axis and having detent means, and driving means arranged for rotation with said gear means and engageable with said detent means for allowing torque to be applied by the gear means to the rotor assembly.

8. The drive mechanism for a picker rotor assembly according to claim 7 wherein said driving means allow for slippage between said gear means and said rotor assembly when either of said predetermined upper limits is exceeded.

9. Drive mechanism for a picker rotor assembly of a cotton harvesting unit, said picker rotor assembly having rotor components including a drive shaft defining an upright axis about which said rotor assembly turns and a plurality of picker bars circumferentially arranged about said drive shaft, with each picker bar having a plurality of individually and rotatable driven picker spindles extending therefrom for picking cotton from a plant row, said drive mechanism comprising:

drive means normally operable in a first direction for driving said rotor assembly including said picker bars about said axis while conjointly driving said spindles about their individual axes to pick cotton as the plant row moves through a plant passage defined by said harvesting unit and being selectively operable in a second direction opposed to said first direction;

an input gear arranged toward an upper end of said drive shaft for rotation in either said first or second direction about said axis and in driving engagement with said drive means; and bidirectional torque limiting means cooperatively associated with said input gear and said drive shaft for transferring motion to said rotor assembly and upon exceeding a predetermined and relatively low torque allowing said drive means to continue to operate in said first direction to inhibit damage to the rotor components upon engagement of said rotor assembly with an obstacle which impedes rotation of the rotor assembly and for transferring motion and relatively high torque to the said rotor assembly when the drive means is operated in said second direction to facilitate removal of the obstacle from impeding rotation of the rotor assembly.

10. The drive mechanism according to claim 9 wherein said rive means comprises a combination gear including a first gear which intermeshes with said input gear and a second gear which intermeshes with a gear set arranged for rotation about said drive shaft to drive said spindles.

11. The drive mechanism according to claim 9 wherein said bidirectional torque limiting means includes a first sleeve member operatively connected to said input gear and driven thereby, a second sleeve member accommodated within said first sleeve member and operatively connected to said shaft, and resiliently biased means for engaging said sleeve members when the torque transferred to said rotor assembly is within a predetermined range and for disengaging said sleeve member when said predetermined torque range is exceeded.

12. The drive mechanism according to claim 11 wherein said bidirectional torque limiting means comprises drive and driven parts arranged in a releasable driving relationship with each other and which are configured such that said predetermined torque range in said second direction is about three times greater than said predetermined torque range in said first direction.

13. The drive mechanism according to claim 9 wherein said bidirectional torque limiting means comprises a tooth ratchet member operatively connected to said drive shaft, resiliently biased pawls carried on said input gear for driving engagement with the teeth on said ratchet wheel, said pawls being permitted to escape over the teeth when torque between said input gear and said rotor assembly exceeds a predetermined limit in either direction.

14. The drive mechanism according to claim 13 wherein the predetermined torque limit in said first direction is significantly less than the predetermined torque limit in said second direction whereby greater torque is transferred to the rotor assembly to facilitate removal of the obstacle than is transferred to the rotor assembly when the rotor assembly is driven to pick cotton.

* * * * *